US006705568B2

(12) United States Patent
Lee

(10) Patent No.: US 6,705,568 B2
(45) Date of Patent: Mar. 16, 2004

(54) VARIABLE AREA WING AIRCRAFT AND METHOD

(76) Inventor: John R. Lee, 912 Constantinople St., New Orleans, LA (US) 70115

( * ) Notice: Subject to any disclaimer, the term of this patent is extended or adjusted under 35 U.S.C. 154(b) by 0 days.

(21) Appl. No.: 10/090,616

(22) Filed: Mar. 6, 2002

(65) Prior Publication Data

US 2003/0168556 A1 Sep. 11, 2003

(51) Int. Cl.$^7$ ................................................ B04C 3/54
(52) U.S. Cl. .......................... 244/46; 244/218; 244/49
(58) Field of Search ........................... 244/218, 46, 49, 244/139, 198

(56) References Cited

U.S. PATENT DOCUMENTS

| | | | | | |
|---|---|---|---|---|---|
| 2,141,984 A | * | 12/1938 | Hilmy | ........................ | 244/218 |
| 3,135,482 A | * | 6/1964 | Girard | ........................ | 244/218 |
| 3,194,514 A | * | 7/1965 | Rogallo | ...................... | 244/1 R |
| 3,273,828 A | * | 9/1966 | James | ........................ | 244/218 |
| 3,507,464 A | * | 4/1970 | Rogallo | .................. | 244/138 R |
| 3,796,398 A | * | 3/1974 | Eilertson | ..................... | 244/139 |
| 4,424,945 A | * | 1/1984 | Dell | ............................. | 244/13 |
| 6,241,195 B1 | * | 6/2001 | Wagner, III | .................. | 244/139 |
| 6,322,021 B1 | * | 11/2001 | Fisher et al. | ............. | 244/137.3 |

* cited by examiner

Primary Examiner—Michael J. Carone
Assistant Examiner—Gabriel Sukman
(74) Attorney, Agent, or Firm—Burns, Doane, Swecker & Mathis, L.L.P.

(57) ABSTRACT

An STOL aircraft structure has a variable-attitude, variable-area wing in addition to a traditional airfoil. The variable wing has an angle of attack that varies from 0° to a predetermined angle far in excess of the stall angle. The variable wing area can be adjusted from 0% to 100% by a roller furling arrangement. The aircraft structure operates during takeoff by deploying the variable wing with an attitude exceeding the stall angle, applying thrust to the aircraft so that the variable wing generates reaction lift and the aircraft attains a predetermined altitude, and stowing the variable wing so that the traditional airfoil is the primary lifting surface. Those steps are reversed for landing.

19 Claims, 12 Drawing Sheets

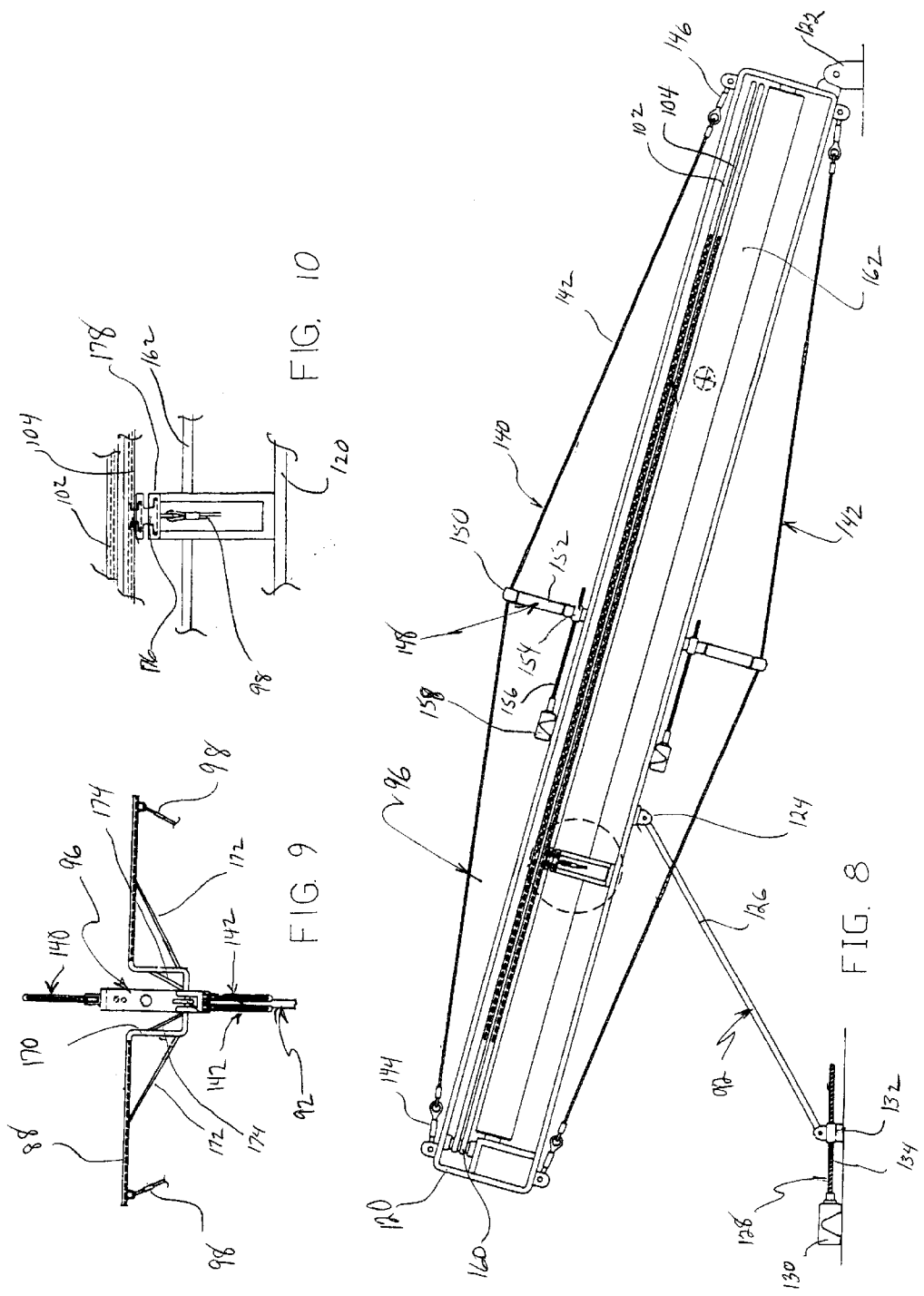

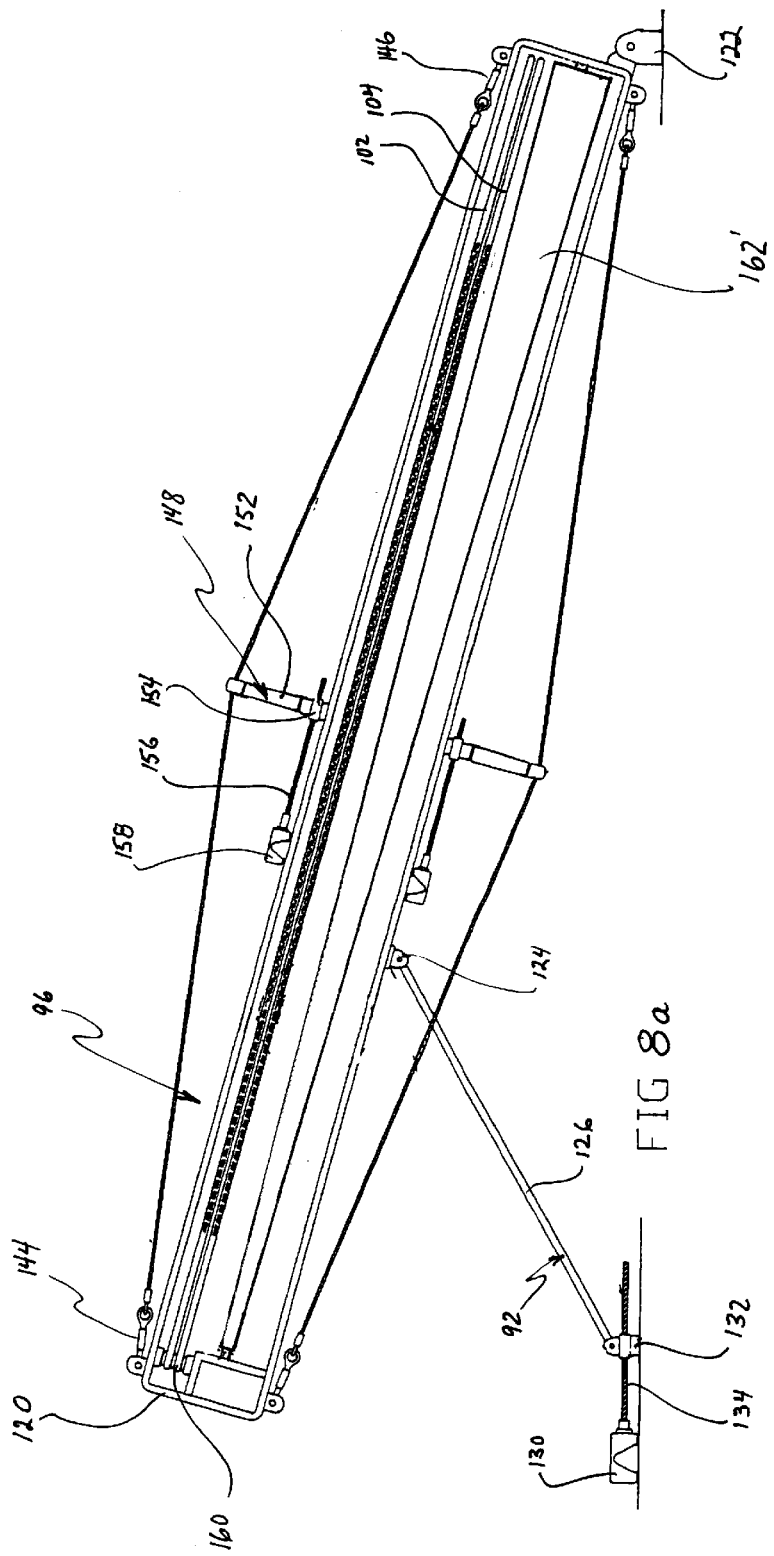

VARIABLE AREA WING AIRCRAFT AND METHOD

BACKGROUND OF THE INVENTION

The present invention relates generally to manned and unmanned aircraft adapted for short take-offs and landings (STOL). More particularly, the present invention deals with a STOL aircraft having a variable-area, variable pitch, deployable wing. In addition, the present invention pertains to a method of operating an aircraft to achieve STOL performance.

OBJECTS AND SUMMARY OF THE INVENTION

Through the years various approaches have been used by aircraft designers and engineers to reduce the length of the ground roll during take-offs and landings. Reduction of ground roll length is desirable for many reasons, only a few of which will be discussed here. For example, shorter runways can be used—thus many otherwise marginal areas can be serviced. Conversely, heavier aircraft gross weights can be used with existing runways—thus permitting larger and more profitable aircraft to be used.

Perhaps the epitome of STOL aircraft are rotary wing aircraft, e.g., helicopters, and directable thrust aircraft, e.g., the Harrier, which can land and take-off vertically. Both the rotary wing aircraft and the directable thrust aircraft require a more complex control system than conventional aircraft. As a result, pilots of such aircraft need special training.

Some of the more conventional approaches to STOL aircraft performance involve the use of wing leading-edge treatments, e.g., slats, and wing trailing-edge treatments, e.g., large flaps, to improve the aerodynamic performance of the wing at low speed operation.

Other nuances to improve aerodynamic performance include use of high aspect ratio wing designs, and wing tip fences. Here again, the emphasis is upon improving the aerodynamics of the lifting surfaces so that greater lift is acquired for a given speed thereby reducing the ground roll or increasing the take-off gross weight.

Another approach to improved STOL performance involves variable position wings. In one position the wings are adapted for lower speed flight, whereas in a second position the wings are adapted for higher speed flight—an example of an aircraft with such variable position wings is the F-111.

The common thread to the known approaches to STOL performance is improved aerodynamic performance of the fixed wing. Only limited improvements can be anticipated without a fresh view of the problem and potential solutions. The present invention heralds a different approach to the desirable characteristic of STOL performance.

A general object of the present invention is to enhance V/STOL aircraft performance by changing the emphasis from simple aerodynamic enhancements.

This and many other objects and advantages are attained in an aircraft structure having a fuselage, a rigid wing, and thrust means, by further providing a deployable wing operably connected to the fuselage so that its angle of attack can be adjusted to a value substantially exceeding the conventional stall angle for the wing-fuselage assembly. In the foregoing manner, the deployable wing operates as a reaction surface with aerodynamic properties.

To permit adjustment of the lift generated by the deployable wing, a mechanism is provided to adjust its angle of attack. In this way, as the aircraft attains a speed and altitude where the auxiliary lift of the deployable wing is no longer needed, the auxiliary lift can be reduced by reducing the angle of attack so that the deployable wing can be stowed. Conversely, when the aircraft begins a landing, deployment of the wing can be controlled so that there is no change in lift until needed.

So that the deployable wing can be stowed, a mechanism for changing the area of the deployable wing is also provided. Accordingly, the wing area can be varied from 100% of full deployment to its fully retracted value which may be 0% or another small value, preferably not greater than about 10% of the full deployment area.

In one embodiment, the deployable wing may have the configuration of a delta wing kite having a central spar about which the wing can be furled and unfurled.

In another embodiment, the deployable wing may comprise a plurality of nested airfoil sections which extend and retract through the trailing edge of the next larger section.

In order to help directionally control the aircraft structure, propulsion may be provided with a Q-fan engine arrangement. Thus, the thrust generated by the engine is further aligned with a longitudinal axis of the structure.

BRIEF DESCRIPTION OF THE DRAWINGS

Many objects and advantages of this invention will be apparent to those of ordinary skill in the art when this specification is read in conjunction with the attached drawings wherein like reference numerals are applied to like elements and wherein:

FIG. 8 is an enlarged detail view of a furling mechanism used in connection with the deployable wing of FIG. 1;

FIG. 8a is an enlarged detail view of a furling mechanism used in connection with the deployable wing of FIG. 1, showing a frustoconical roller;

FIG. 9 is a left end view of the mechanism of FIG. 8;

FIG. 10 is an enlarged detail view of a cable attachment assembly of FIG. 8;

DETAILED DESCRIPTION OF THE PREFERRED EMBODIMENT(S)

Figure 1:
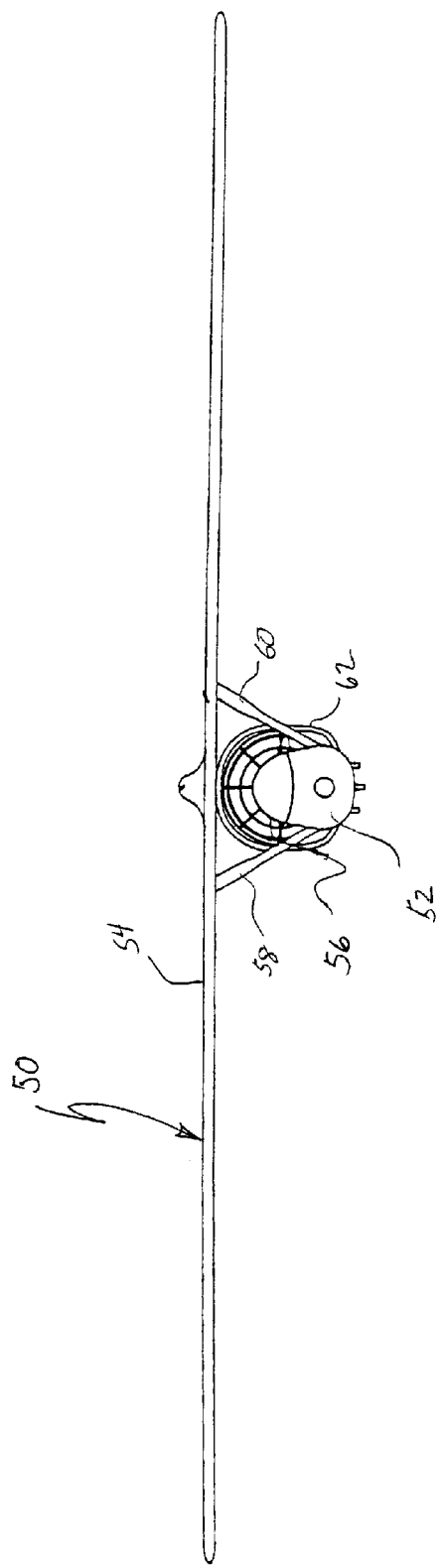
FIG. 1 is a front elevational view of one embodiment of the aircraft structure according to this invention.
Figure 2:
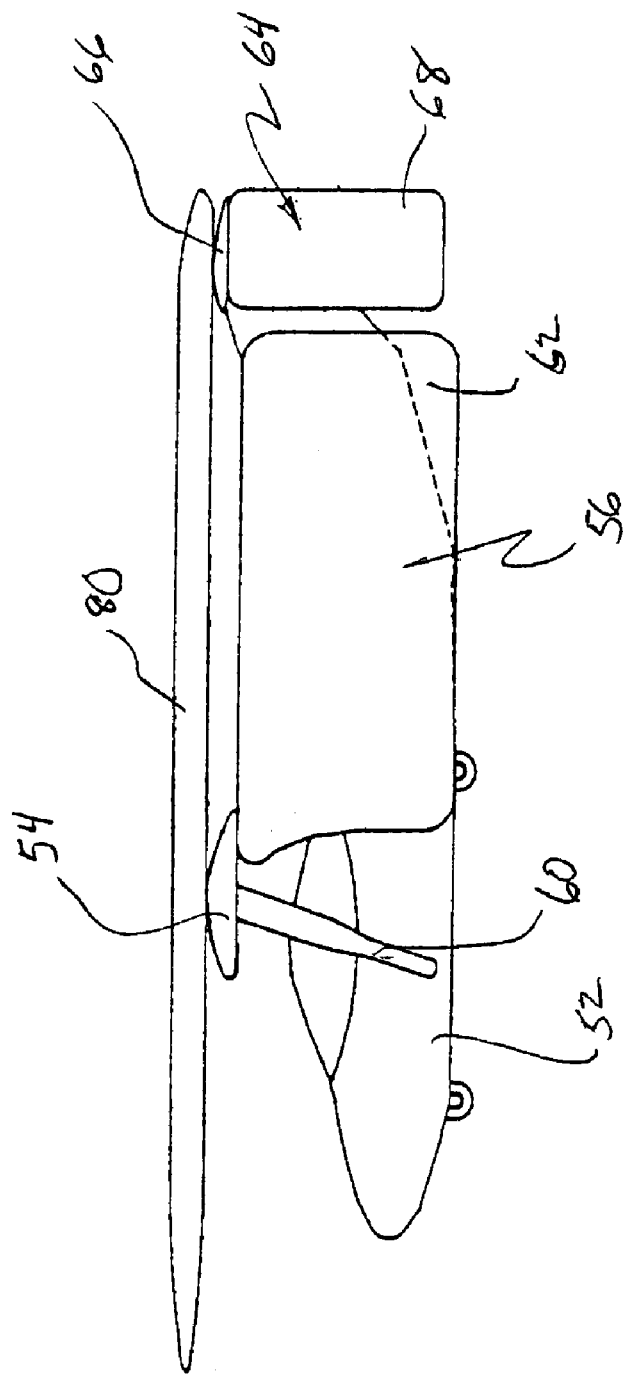
FIG. 2 is a side elevational view of the aircraft structure of FIG. 1.

In accord with the present invention, an aircraft structure 50 (see FIG. 1) includes a fuselage 52, a high fixed wing 54, and a thrust means 56. The thrust means 56 includes a duct 62. The fixed wing 54 is preferably spaced above the fuselage 52, attached to the top of the duct 62, and rigidly supported in that position by a pair of struts 58, 60. Each strut 58, 60 (see FIG. 2) is attached at one end to the fuselage 52 and at the other end to the fixed wing 54. Moreover, these struts 58, 60 are raked rearwardly to further stiffen the attachment of the wing.

A tail assembly 64 is attached at the back end of the fuselage 52. The tail assembly 64 includes a horizontal stabilizer 66 and a vertical stabilizer 68. Preferably the vertical stabilizer 68 extends downwardly beneath the horizontal stabilizer 66 and has a vertical extent corresponding to the vertical height of the duct 62. By positioning the vertical stabilizer so that it is in longitudinal alignment with the thrust means 56, air ejected from the thrust means 56 impinges upon the vertical stabilizer 68 improving the yaw control and turning about a vertical axis.

A storage means 80 extends longitudinally along the fuselage 52 and is attached to the horizontal stabilizer 66 and to the fixed wing 54. By virtue of that attachment, the storage means 80 is also a structural element of the aircraft 50 and could be designed to aerodynamically blend with the fuselage. In the interest of clarity, the storage means is depicted here as a distinct element.

Figure 3:
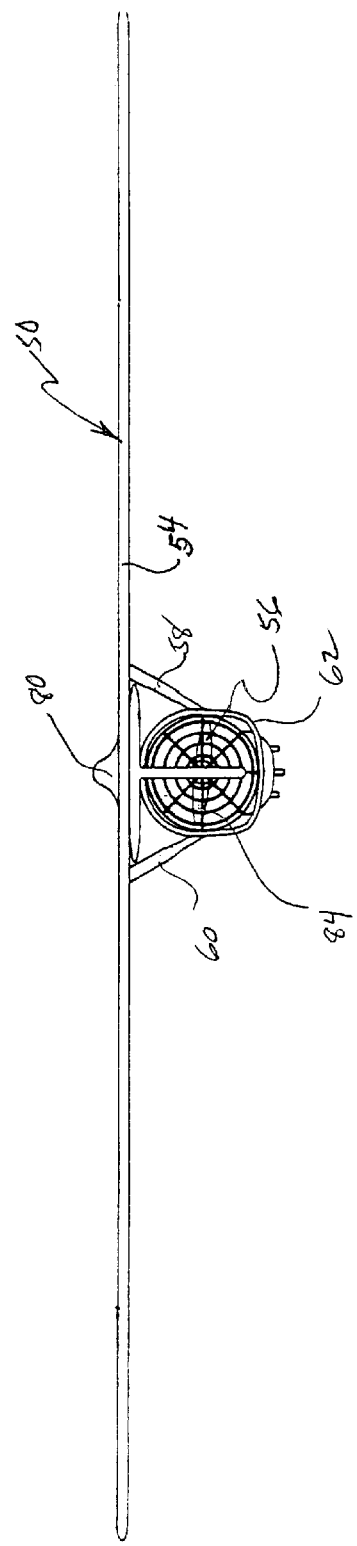
FIG. 3 is a rear elevational view of the aircraft structure of FIG. 1.

The thrust means 56 may, for example, include a gas turbine engine which drives a propeller 84 (see FIG. 3) that rotates within the shroud 62. The propeller or fan may be mounted to the fuselage in a suitable conventional manner. As shown in the figures, the propeller may be positioned at the aft end of the fuselage.

While a gas turbine engine may be used as the primary propulsion source, other propulsion systems may also be considered. For example, depending upon the application, it may be desirable to provide a jet-assisted take-off and then use another suitable conventional power source for sustained powered flight. An internal combustion engine could be used for such sustained powered flight. Moreover, given its relatively low fuel consumption, a diesel engine may be used for such sustained powered flight.

The shroud 62 can extend from a position forward of the trailing edge of the fixed wing 54 (see FIG. 2) to a position just forward of the tail assembly 64. Thus, the propeller 84 generates a substantial jet of air rearwardly. Moreover, by virtue of the shroud 62, the propeller driven air jet does not interfere with the aerodynamic performance of the fixed wing 54.

Figure 4:
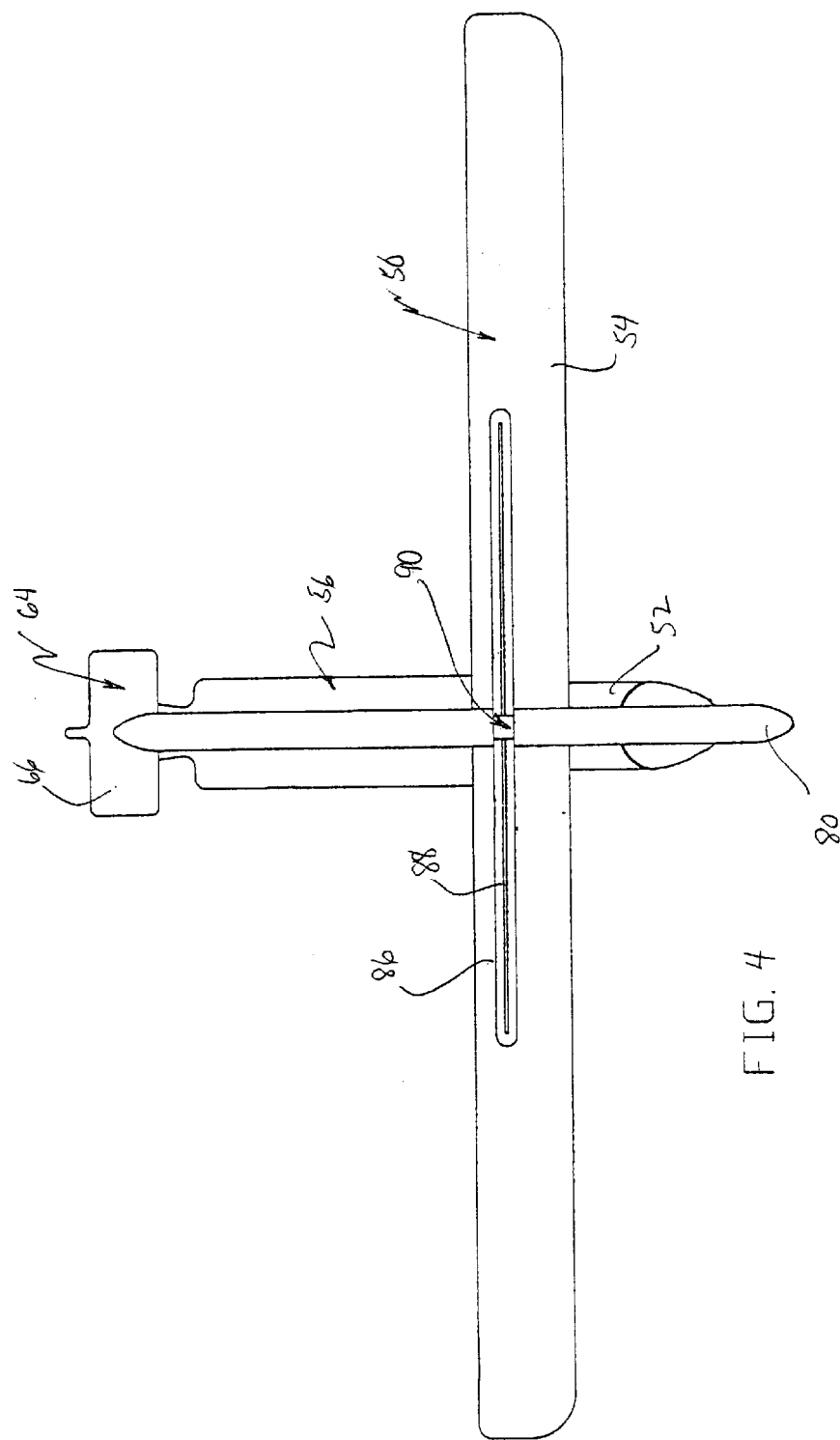
FIG. 4 is a plan view of the aircraft structure of FIG. 1.

The fixed wing 54 has a high aspect ratio (see FIG. 4). Preferably, the aspect ratio is on the order of 15. Although, any aspect ratio in excess of about 10 is within the scope of the invention. on the top of the wing 54 is a storage recess 86 that extends longitudinally along the wing and is approximately centered relative to the longitudinal centerline or axis of the fuselage 52. The storage recess 86 has a length of about half the span of the fixed wing 54, i.e., the distance between the two outboard tips of the fixed wing 54. A spreader bar 88 is adapted to be received in the storage recess 86 so that the aerodynamic performance of the fixed wing is affected as little as possible. For example, the recess 86 may be designed with a closure door that opens to expose the spreader bar and which closes when the spreader bar has been removed so as to provide a smooth surface for the suction side of the fixed wing 54.

The spreader bar 88 is part of the deployable wing assembly 90 stowed in the storage tube 80.

Figure 5:
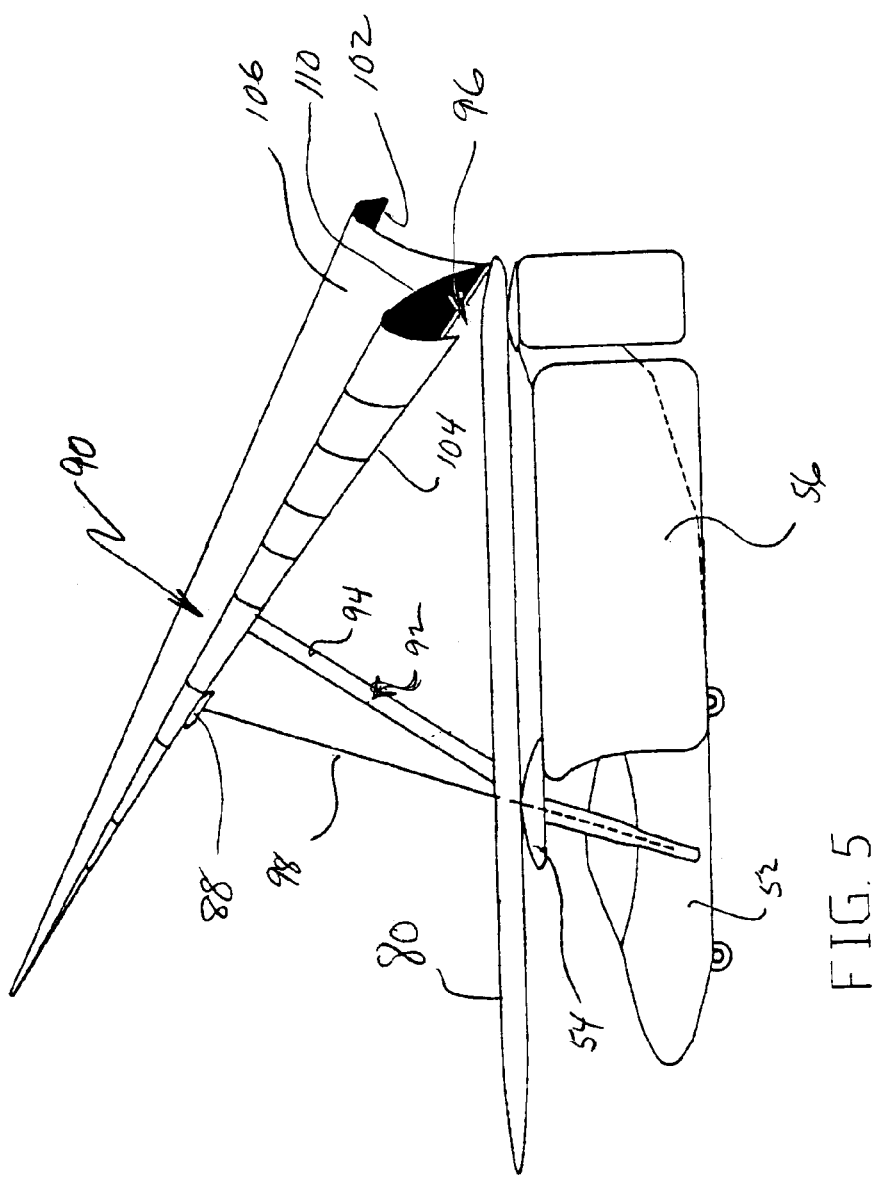
FIG. 5 is a side elevational view of the aircraft structure of FIG. 1 with a deployable wing in operating position.

The deployable wing assembly 90 is preferably pivotally connected to the aft end of the storage tube 80 (see FIG. 5). An assembly 92 for elevating the forward portion of the deployable wing assembly 90 may include, for example, a telescopically extensible hydraulic lifting jack 94. One end of such a lifting jack is pivotally connected to the storage tube 80 at a position generally in vertical alignment with the fixed wing 54. The other end of such a lifting jack 94 is pivotally connected to a furling assembly 96 disposed longitudinally extending along the center of the deployable wing assembly 90.

The elevating assembly 92 is operable to adjust the angle of attack for the deployable wing 90 between 0° where the deployable wing 90 is in its storage position and a value generally of about 45°. The upper end of that range, i.e., 0° to 45° is a value which substantially exceeds the stall angle for the aircraft structure without the deployable wing. More particularly, this is a reference to the stall angle as conventionally defined for an aircraft structure. The elevating assembly 92 is, preferably, continuously adjustable so that it can position the deployable wing assembly 90 at any desired position between the ends of its range. In that way, the deployable wing 90 can be controlled during its deployment.

Figure 6:
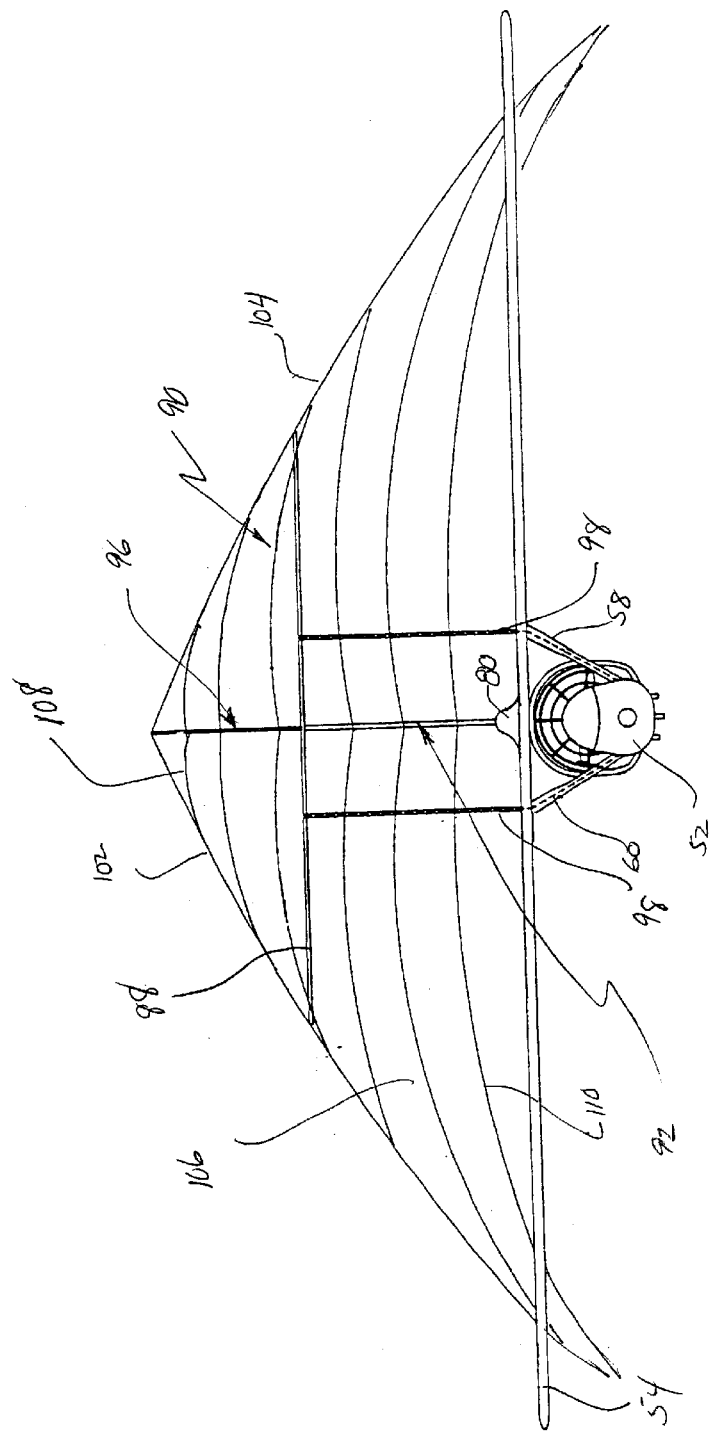
FIG. 6 is a front elevational view of the aircraft structure of FIG. 1 with a deployable wing in operating position.

To laterally stabilize the deployable wing assembly 90 and to move the wing between a deployed position and a storage position, a pair of cables 98 (see FIG. 6) is provided. Each cable 98 is attached to the spreader bar 88 that is part of the deployable wing assembly 90. Each cable 98 extends generally vertically downwardly from the spreader bar 88, through the fixed wing 54, and through a corresponding one of the wing support struts 58, 60 to the fuselage 52. In the fuselage, suitable conventional winching apparatus (not shown) is provided along with suitable conventional controls (not shown) that cooperate to allow the cables 98 to be extended under modest tensile resistance during deployment of the deployable wing assembly 90 and to retract the deployable wing assembly 90 over resistance of the elevating means 92.

In the illustrated embodiment of the deployable wing assembly 90, a pair of spars 102, 104 are pivotally attached to each other and to the forward end of the furling assembly 96. Each spar 102, 104 has a length corresponding to the length of the furling assembly 96 so that the spars 102, 104 can be enclosed in the storage tube 80 when stowed. Moreover, each spar 102, 104 is slidably connected to the spreader bar 88 so that the spars 102, 104 can be drawn toward a parallel relationship with the longitudinal axis of the furling assembly 96 as the flexible surface portion 106 is retracted.

Extending between the spars 102, 104 and attached to the furling assembly 96 is continuous flexible surface portion 106. As can be seen from a comparison of FIGS. 4 and 6, the flexible surface portion 96 has an area which substantially exceeds the area of the fixed wing 54. Preferably, the flexible surface portion 106 is fashioned from a high tensile strength fabric. While there are likely a variety of suitable fabrics, one suitable fabric, for example, is an aromatic polyamide fiber such as KEVLAR sold by E. I. duPont. The flexible surface portion 106 is symmetrical along a longitudinal axis, and is attached along the side edges to the spars 102, 104. In addition, the flexible surface portion 106 is attached to the furling assembly 96 at one or more points along the axis of symmetry. Preferably, there is just one attachment point. The leading edge 108 of the flexible surface portion 106 may be attached to the spars 102, 104. But otherwise, the leading edge 108 and the trailing edge 110 of the flexible surface portion are unsupported. Accordingly, the flexible surface portion 106 is able to function similarly to a kite.

It will be appreciated by those skilled in the art that an aircraft structure with the characteristics described herein has an improved and unique ability to soar for extended periods of time with low fuel consumption. Such attributes may be useful, for example, in drone aircraft and/or surveillance aircraft, whether manned or unmanned.

Figure 7:
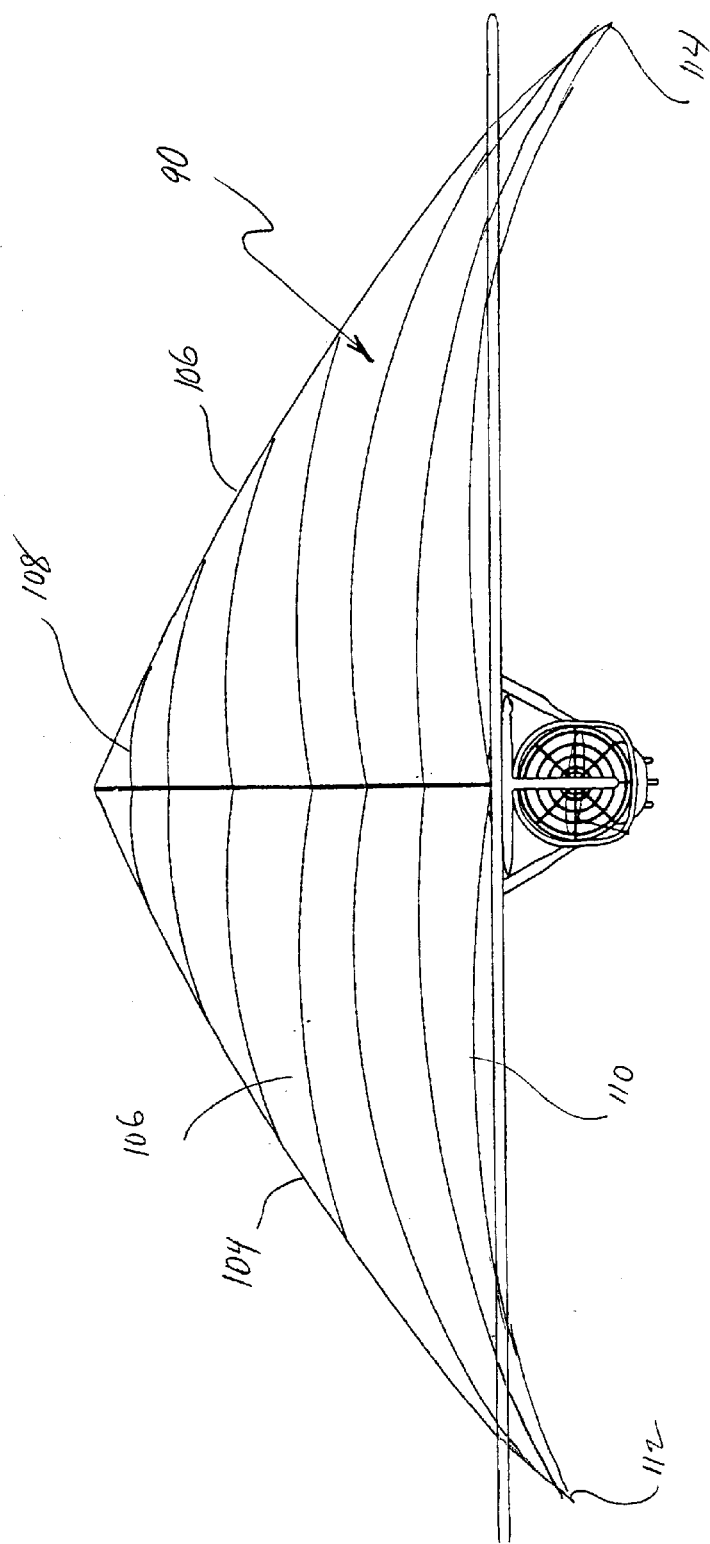
FIG. 7 is a rear elevational view of the aircraft structure of FIG. 1 with a deployable wing in operating position.

As illustrated, the trailing corners 112, 114 (see FIG. 7) of the deployable wing assembly 90 are free of connections with the aircraft structure. More particularly, the corners 112, 114 are defined by the trailing edge 110 of the flexible surface portion 106 and the associated spar 102, 104. If desired, it would also be possible to use cable attachments in order to reduce the cross section, and thus the weight, of the spars 102, 104.

With reference to FIG. 8, a detailed illustration of one embodiment of the furling mechanism 96 is depicted. The furling mechanism 96 may include a generally rectangular truss member 120. one end of the truss member 120 is pivotally connected to the airframe structure by a suitable conventional mount 122. The lifting mechanism 92 is pivotally connected to a suitable conventional connector 124 located on the bottom side of the forward half of the truss member 120. As illustrated, the lifting mechanism 92 may comprise a rigid rod 126 having one end connected to the truss member 120 at the connector 124 and the other end pivotally attached to a screw jack assembly 128 that, in turn, is mounted to the aircraft structure.

The screw jack assembly 128 includes an elongated screw rod 134 that may be driven by an electric motor 130. The rod 126 is pivotally connected to a carriage 132 which translated along the screw rod 134 when the screw rod 134 is rotated by the motor 130. Translation of the carriage 132 moves the rod 126 so that the furling assembly 96 is raised or lowered. The carriage 132 and the screw rod 134 are arranged so that the furling assembly 96 can be moved between the limiting positions discussed above.

As will be apparent from the foregoing description, the furling assembly 96 is subjected to significant aerodynamic pressure loads during use. Thus, to stiffen the truss member 120, collapsible truss stiffeners 140, 142 may be provided on both the top and the bottom of the truss member 120. To accommodate the central location of the attachment for the lifting assembly 92, a pair of collapsible truss stiffeners 142 (see FIG. 9) may be provided on the bottom. The truss stiffeners 140, 142 (FIG. 8) may all be of the same construction, accordingly, it will suffice to describe only one of the stiffeners in detail.

The truss stiffener 140, for example, includes a truss wire 142 extending between connections 144, 146 to the truss member 120, at least one of those connections being positioned closely adjacent to corresponding ends of the truss member 120. Each connection 144, 146 is adjustable so that the tension in the truss wire 142 can be adjusted as desired. The truss stiffener 140 has a collapsible mechanism 148 which is operable to establish a strut between the ends of the truss member 120. The strut may be located at the center of the truss member 120, as illustrated. Alternatively, the strut may be positioned in alignment with the center of aerodynamic pressure applied to the deployable wing.

The strut preferably comprises three sections 150, 152, 154 hinged together so that the strut can be raised and lowered. The first, or cable attachment, section 150 is preferably fixed to the wire 142 at the desired position between the wire ends. The center section 152 is hinged to the cable attachment section 150 so as to be foldable about an axis extending transversely to the longitudinal axis of the truss member 120. The third, or jack carriage, section 154 is hinged to the center section 152 so that it is also foldable about an axis extending transversely to the longitudinal axis of the truss member 120. The hinge axis between the cable attachment section 150 and the center section 152 is on the opposite side of the strut from the hinge axis between the center section 152 and the jack carriage section 154 so that strut can be lowered by translating the jack carriage section 154 along the truss frame 120. That translatory movement is provided by a rotary screw rod 156 that is rotatably driven by, for example, an electric motor 158 attached to the truss structure 120.

With the foregoing arrangement, the truss assembly 120 is laterally stiffened in the direction of force loading applied by the deployable wing. As noted above, the spars 102, 104 along the edges of the deployable wing are pivotally connected. That pivotal connection 160 may be disposed within the truss assembly 120 at the forward end thereof. As seen in FIG. 8, the spars 102, 104 can be stowed within the longitudinal confines of the truss assembly 120.

Positioned in the truss assembly 120 is a furling roller 162 which has a length exceeding the longitudinal extent of the flexible surface of the wing. The furling roller 162 is rotatably mounted in the truss assembly 120 with its axis parallel to the longitudinal axis of the truss assembly 120 and powered by one or more internal electric motors that can rotate the furling roller 162 both clockwise and counterclockwise. The flexible surface of the wing is attached to the surface of the furling roller 162 at one or more points, as previously noted. Accordingly, as the furling roller 162 is turned in one direction, the flexible wing is deployed from the furling roller 162 and the spars 102, 104 pivot outwardly. Conversely, when the furling roller 162 turns in the other direction, the flexible wing is wound on the surface of the furling roller 162 and the spars 102, 104 are pivotally retracted toward their stowed position.

The furling roller 162 may be driven in any suitable conventional manner. For example, an electric, hydraulic, or pneumatic motor may be provided inside the furling roller 162.

While the furling roller 162 is depicted as being generally cylindrical, it could be designed so as to be frustoconical in longitudinal cross section 162' (FIG. 8a). In that event the ratio of the diameter at the front of the roller 162' to the diameter at the back of the roller 162' would preferably be selected to be proportional to the ration of the length of the leading edge 108 (FIG. 6) to the length of the trailing edge 110 so that the flexible surface is retracted proportionally along its length.

The spreader bar 88 (see FIG. 9) may be provided with a generally U-shaped bend 170 in the middle thereof to accommodate the furling assembly 96. In addition, motor-driven threaded rods are preferably provided in the spreader bar to cover T-headed glides therein. To stiffen the spreader bar 88 against bending forces, braces 172, 174 may be attached in the vicinity of the U-shaped bend 170. To further provide structural support, the spreader bar may be provided with stiffening structures on its bottom surfaces, such as angle iron shapes or I-beam shapes. The spars 102, 104 are slidably connected to the spreader bar 88 (see FIG. 10) by providing each spar with a T-headed glide 176 which is trapped within and slidable in a conforming slot 178 in the top of the spreader bar 88.

To accommodate fore-and-aft movement of the spreader bar during spreading of the spars as the wing is deployed, T-headed glides may be provided in conformingly shaped slots in the spars 102, 104.

Figure 11:
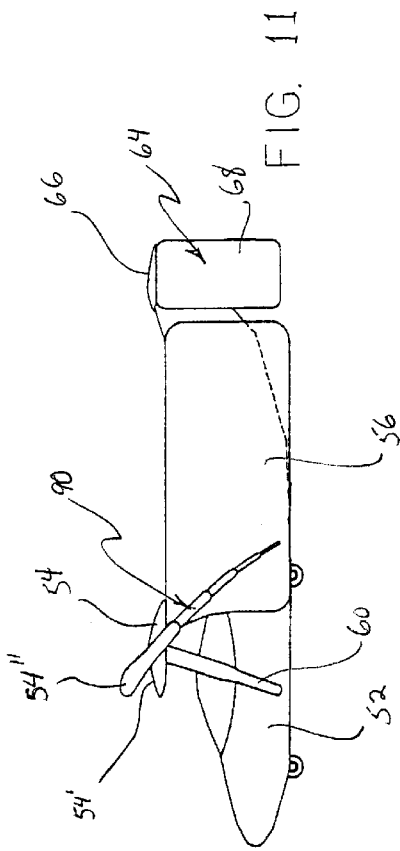
FIG. 11 is a side elevational view of a second embodiment of the aircraft structure according to the present invention.
Figure 12:
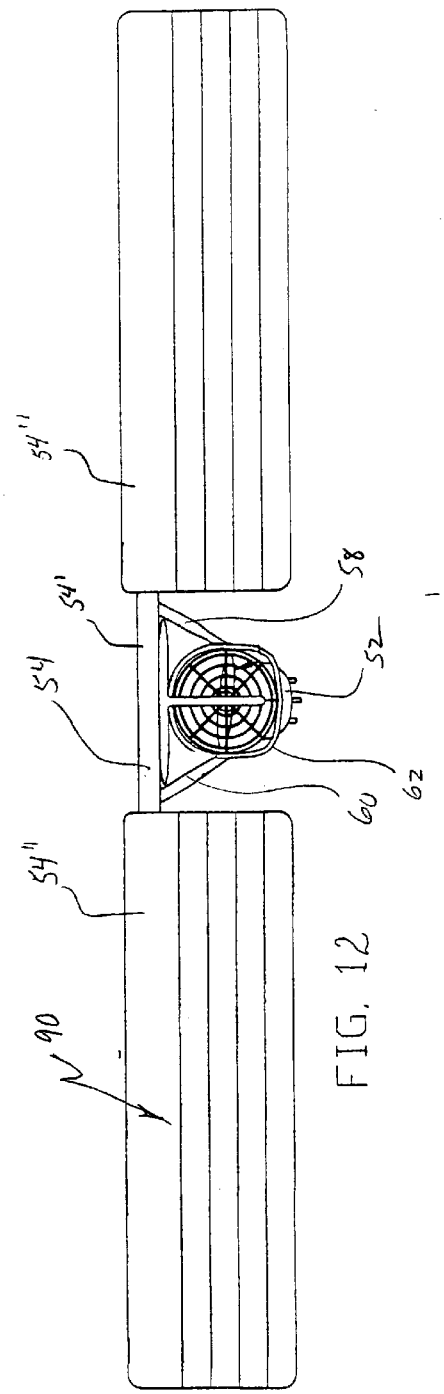
FIG. 12 is a rear elevational view of the aircraft structure of FIG. 11.

A second embodiment of the deployable wing 90 is illustrated in FIG. 11. In this version, the fixed wing 54 has a nonmovable portion 54' and two relatively rotatable portions 54". The nonmovable portion 54' (see FIG. 12) is centered above the fuselage 52. The moveable portions 54" are mirror images of one another and are positioned outboard of the nonmovable portion 54'. The moveable portions 54" can be rotated about an axis which extends transversely to the longitudinal extent of the fuselage 52 from a position where the cross section of each movable portion 54" is in alignment with the cross section of the nonmovable portion 541 to a position where the cross section of the movable portions 54" is substantially in excess of the stall angle for the structure.

Figure 13:
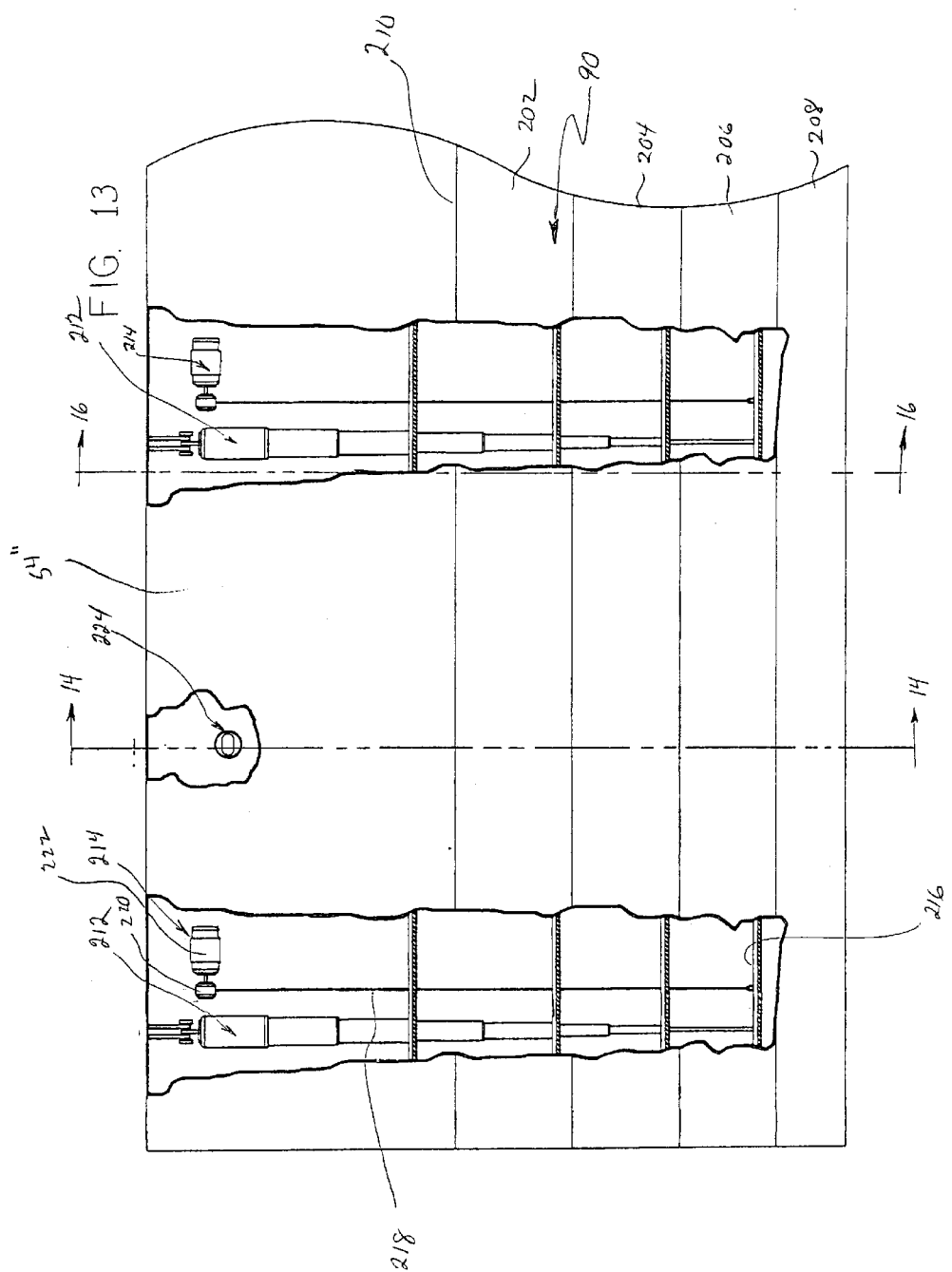
FIG. 13 is an enlarged view of a portion of the wing structure of FIG. 12 with portions broken away to illustrate hidden details.

Each of the two movable wing portions 54" includes a part of the deployable wing assembly 90. More particularly (see FIG. 13) the wing portion 54" includes four nested sections 202, 204, 206, 208 which extend outwardly from the trailing edge 210 of the wing portion 54". The nested sections 202, 204, 206, 208 are extended and retracted from the trailing edge 210 by a pair of telescoping hydraulic or pneumatic cylinders 212 and retraction assemblies 214. This deployable wing has an area that is substantially greater in area than conventional flaps and should not be confused with the nature and function of flaps.

One end of each cylinder 212 is attached to the moveable wing portion 54" while the other end of each cylinder 212 is attached to the forward edge 216 of the outermost nested section 208. similarly, one end of the retraction assembly 214 is attached to the moveable wing portion 54" and the other end is attached to the forward edge 216 of the outermost nested section 208. The retraction assemblies 214 may each comprise a cable 218 that is secured to a wind-up pulley 220 driven by a suitable conventional motor 222. The motor 222 may be electric, pneumatic, or hydraulic.

Figure 14:
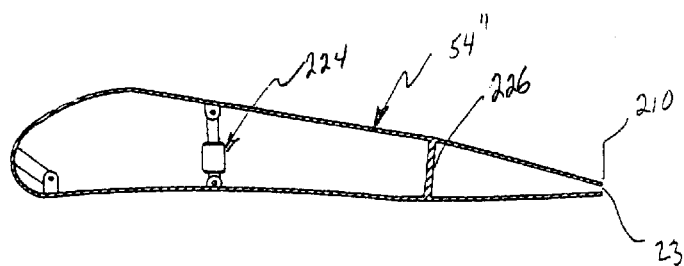
FIG. 14 is a cross-sectional view taken along the line 14—14 of FIG. 13.

To facilitate deployment of the wing 90, a wing pinching mechanism 224 may be provided. The wing pinching mechanism 224 (see FIG. 14) may, for example, includes a hydraulic or pneumatic cylinder that extends between the upper and lower surfaces of the moveable wing portion 54". The moveable wing portion 54" also includes a telescoping vertical spacer 226 positioned between the pinching mechanism 224 and the trailing edge 210. When the pinching mechanism is extended in length, the gap 230 at the trailing edge opens; conversely, when the pinching mechanism 224 is shortened in length, the gap 230 at the trailing edge closes down. Slots may be provided in the nested telescoping sections so that the nested sections move past the vertical spacer 226.

Figure 15:
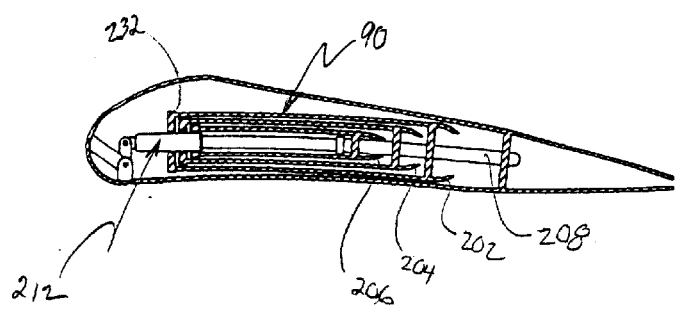
FIG. 15 is a cross-sectional view showing the deployable wing in its retracted position.

When the deployable wing 90 is in its fully retracted or stowed position (see FIG. 15), each of the nesting sections 202, 204, 206, 208 is withdrawn to a position where it is inside the next larger section and where the largest section 202 is contained within the moveable wing portion 54". In addition each section 202, 204, 206, 208 has an enlarged shoulder 232 at the top and the bottom. These shoulders on each section establish abutment surfaces that limit the distance which any of the nested sections can extend relative to the next larger section.

Figure 16:
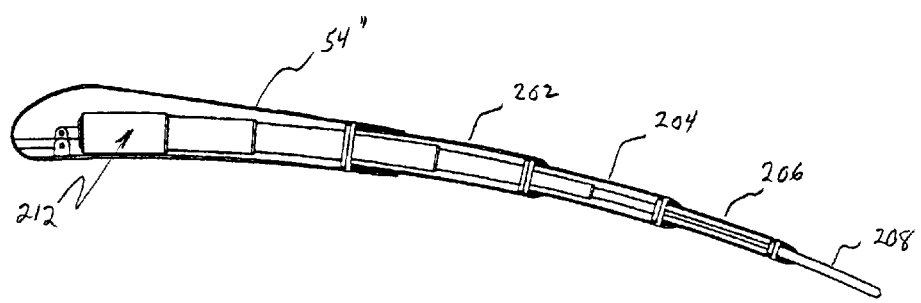
FIG. 16 is a cross-sectional view taken along the line 16—16 of FIG. 13.

When the cylinders 212 have been fully deployed (see FIG. 16), the nested sections 202, 204, 206, 208 assume the position illustrated. Accordingly, it will be readily seen that the deployable wing 90 substantially increases the area of the wing 54.

Where the wing 90 has a low aspect ratio (see FIG. 11), the upper surface of the wing 90 can be provided with a flexible covering extending from the leading edge to the trailing edge. Such a flexible covering would balloon outwardly in response to air pressure creating lift aerodynamically. A roller assembly (not shown) within the leading edge of the wing 90 can furl and unfurl the flexible covering as necessary.

There are, of course, other aircraft structure embodiments that can be envisioned which fall within the scope of the invention. For example, an adjustable delta wing, or a rogallo delta wing could also be used and still fall within the spirit and scope of this invention.

The STOL operation of an aircraft structure having a deployable wing will now be described during a take-off operation. It is to be understood that, during a landing operation, the sequence of steps to be described would be reversed.

Before actually beginning the take-off roll, the deployable wing 90 must be extended. To this end, the lifting assembly 92 (see FIG. 8) is actuated to raise the forward end of the deployable wing 90. More particularly, the motor 130 is activated, causing the threaded rod 134 to rotate, moving the carriage 132 toward the pivot connection 122. As a result, the rod 126 is translated aft and rotated about the connection 124. That movement of the rod 126 elevates the forward end of the truss assembly 120 to the predetermined position for lift-off. That predetermined position is, as described above, one where the angle of attack of the deployable wing substantially exceeds the stall angle for the structure without the deployable wing section. While the truss assembly 120 is elevated, the spreader bar 88 (see FIG. 6) is also elevated from the wing 54 and the cables 98 are extended. By controlling payout of the cables 98, those cables 98 stabilize the deployable wing 90 in the lateral direction.

With the furling assembly 96 in its elevated position, the motors 158 are driven to move the collapsible truss stiffeners into the protruding position. After the furling assembly as thus been deployed and stiffened, the furling roller 162 is rotated to deploy the flexible surface portion 106 (see FIG. 6) and the edge spars 102, 104. To move the spars outwardly away from the truss assembly 120, motor driven threaded rods within the spreader bar may be used. The threaded rods will control the sliding of the T-headed guides noted above. When the wing 90 is fully deployed, power is applied to the Q-fan engine 56 (see FIG. 5). As the aircraft structure begins its ground roll, the deployable wing 90 fills and becomes taught on its spars 102, 104. Since the deployable wing is disposed at a high angle of attack, exceeding the stall angle, the deployable wing 90 functions as a reaction surface with aerodynamic properties, i.e., like a kite rather than an airfoil. As a result of the substantially increased wing area and the reaction dynamics, the aircraft structure has a comparatively short ground roll.

When the aircraft structure is airborne, and has attained a stable altitude, the deployable wing is lowered and stowed, the motor of the lifting assembly is reversed to move the carriage 132 forward, thereby lowering the forward end of the furling assembly 96. While the furling assembly 96 is being lowered, tension is maintained on the cables 98 (see FIG. 6) so that the spreader bar 88 is maintained substantially parallel to the fixed wing 54 as it is lowered.

When the deployable wing assembly 90 is fully lowered, the spreader bar 88 (see FIG. 4) is received within the slot 86 on top of the fixed wing 54.

To effect stowage, the furling roller 162 (see FIG. 8) is rotated to begin reducing the area of flexible surface that is deployed. As the furling roller 162 operates, the pilot makes such control compensation as is necessary with the other aerodynamic surfaces of the aircraft. By the time the flexible surface is fully wound on the furling roller 162, the normal aerodynamic surfaces, i.e., the wing and the tail, provide the requisite lift for the aircraft. What remains, then, is to complete stowage of the furling mechanism 96. To this end, the motors 158 are driven to collapse the truss stiffeners 140, 142.

If desired, a faired housing can be provided to close over top of the furling assembly 96 as illustrated. Likewise, a faired housing can close over top of the spreader bar 88, if desired.

The aircraft structure can then continue to its destination. Upon arrival in the vicinity of its destination, the aircraft structure can land normally or, the deployable wing can be used by reversing the procedure discussed above.

While operation of the second embodiment of the invention is substantially similar to operation of the first embodiment, there are some differences. Accordingly, operation of the second embodiment will now be discussed for the sake of completeness.

The pinching cylinders 224 (see FIG. 13) are extended to increase the gap 230 at trailing edge 210 of the movable wing portion 54". When that trailing edge gap has been opened, the hydraulic cylinders 212 (illustrated schematically) are energized and extended. As the cylinders 212 extend, the nested sections 208, 206, 204, 202 of the deployable wing 90 are extended outwardly and aft through the trailing edge gap 230. With the deployable wing 90 fully extended, the movable wing portion 54" is rotated so that its angle of attack exceeds the stall angle for the aircraft structure. At this point, the pinching cylinders 224 are retracted to close the trailing edge gap 230 into close relationship with the deployable wing section 202 which projects therethrough.

It will be appreciated that the movable wing section 54" could be rotated first and the deployable wing then extended, as desired.

Power is then applied to the Q-fan engine 56 (see FIG. 11). As the aircraft begins its ground roll, the combination of the fixed wing 54 and the deployable wing 90 present a substantially larger lifting area. Moreover, due to the very high angle of attack of the moveable wing portions 54", the extended wings provide lift force by reaction with aerodynamic properties. Again, the wing functions more akin to a kite than an airfoil.

When the aircraft attains the desired altitude, the movable wing portions 54" are rotated toward their normal flight position (i.e., similar to the position of the nonmovable wing portion 54'). When the movable wing portions 54" are in that normal flight position, the pinching cylinders 224 are energized to increase the trailing edge gap 230 and ease stowage of the extended deployable wing 90. Then, the motors 214 (see FIG. 13) of the retraction assembly are energized causing the cable to be wound on the spool 220. Accordingly, the sections 202, 204, 206, 208 are retracted into one another in nested relationship, with the nested sections being enclosed within the portion 54" of the fixed wing. The pinching cylinder is then retracted so that the trailing edge gap 230 is substantially closed.

Here again, upon reaching the desired destination, the aircraft can land normally. Alternatively, the deployable wing 90 can be used f or a STOL landing by reversing the procedure set forth above.

While the STOL take-off has been described above, it will further be apparent that either of the embodiments described can use a normal take-off procedure where the deployable wing is not used. In such event, the deployable wing will be used at the destination if STOL performance is needed in the landing.

It will also be apparent to those of skilled in the art that the structures described above can be used in manned and unmanned aircraft. Thus, the structures could, for example, be used in drone aircraft, unmanned reconnaissance aircraft, or soaring weapons platforms. The deployable wings enhance the extended soaring capacity of any aircraft and thus provide improved range and fuel efficiency to aircraft propelled by otherwise conventional power plants.

It will now be apparent that a new, useful, and unobvious STOL structure and method of operation have been disclosed which overcome problems associated with previously known STOL structures and methods of operation. Moreover, those skilled in the art will appreciate that numerous modifications, variations, substitutions, and equivalents exist for various features of the invention. Accordingly, it is expressly intended that all such modifications, variations, substitutions, and equivalents which fall within the spirit and scope of the invention as defined by the appended claims be embraced thereby.

What is claimed is:

1. An aircraft structure adapted for short takeoff and landing performance comprising:

a fuselage with a longitudinal axis;

a wing extending transversely of the fuselage and attached thereto, having a normal flight position and an area, the fuselage and the wing in the normal flight position having a stall angle;

thrust means attached to one of the fuselage and the wing, operable to move the fuselage generally in the direction of the longitudinal axis;

a deployable wing with a wing axis, operably connected to the fuselage so that an angle of attack defined between the longitudinal axis and wing axis can be adjusted in the range from 0° to a predetermined angle substantially exceeding the stall angle;

means for regulating the angle of attack of the deployable wing, operably connected between the deployable wing and the fuselage;

means for changing the area of the deployable wing between a fully retracted value and a fully deployed value;

wherein the thrust means includes a gas turbine engine disposed in general longitudinal alignment with the fuselage; and wherein the thrust means includes a Q-fan engine.

2. An aircraft structure adapted for short takeoff and landing performance comprising:

a fuselage with a longitudinal axis;

a wing extending transversely of the fuselage and attached thereto, having a normal flight position and an area, the fuselage and the wing in the normal flight position having a stall angle;

thrust means attached to one of the fuselage and the wing, operable to move the fuselage generally in the direction of the longitudinal axis;

a deployable wing with a wing axis, operably connected to the fuselage so that an angle of attack defined between the longitudinal axis and wing axis can be adjusted in the range from 0° to a predetermined angle substantially exceeding the stall angle;

means for regulating the angle of attack of the deployable wing, operably connected between the deployable wing and the fuselage;

means for changing the area of the deployable wing between a fully retracted value and a fully deployed value;

wherein:

the deployable wing is housed in a furling tube having two ends, one end being pivotally attached to the fuselage;

the means for regulating the angle of attack includes a lifting jack connected between the fuselage and the other end of the furling tube;

the deployable wing includes a flexible surface portion;

the furling tube contains:

a roller connected to the flexible surface portion, and means for rotating the roller such that the flexible surface is wrapped around the roller as the roller rotates;

the flexible surface portion has a generally trapezoidal shape with two generally parallel edges; and the roller is tapered such that the ratio of the diameters corresponds to the ratio of the lengths of the generally parallel edges so that the flexible surface portion is smoothly wrapped on the roller.

3. The aircraft structure of claim 2 wherein the thrust means includes a gas turbine engine disposed in general longitudinal alignment with the fuselage.

4. The aircraft structure of claim 3 wherein the gas turbine engine includes a ducted fan.

5. The aircraft structure of claim 3 wherein the thrust means includes a diesel engine.

6. The aircraft structure of claim 2 wherein the fuselage includes a horizontal tail surface and a vertical stabilizer surface extending downwardly from the tail surface.

7. The aircraft structure of claim 6 wherein the thrust means is positioned between the fuselage and the vertical stabilizer surface to enhance low speed maneuverability.

8. The aircraft structure of claim 2 wherein the deployable wing includes a flexible surface portion having an area substantially exceeding the area of the wing.

9. The aircraft structure of claim 8 wherein the flexible surface portion is fashioned from a high-strength fabric.

10. The aircraft structure of claim 9 wherein the fabric is fashioned from an aromatic polyamide fiber.

11. The aircraft structure of claim 8 wherein the deployable wing includes a central spar and a spreader bar generally transverse to the central spar, the flexible surface portion being connected to the central spar.

12. The aircraft structure of claim 2 wherein:

the deployable wing is housed in a furling tube having two ends, one end being pivotally attached to the fuselage; and the means for regulating the angle of attack includes a lifting jack connected between the fuselage and the other end of the furling tube.

13. The aircraft structure of claim 2 wherein:

the deployable wing includes a flexible surface portion; and the furling tube contains:

a roller connected to the flexible surface portion, and means for rotating the roller such that the flexible surface is wrapped around the roller as the roller rotates.

14. A method of shortening the take-off of an aircraft structure having a standard wing with an area and a stall angle and comprising the steps of:

extending a deployable wing having an area substantially exceeding the area of the standard wing;

positioning the deployable wing at an angle of attack that substantially exceeds the stall angle of the standard wing;

powering the aircraft structure so that it begins to move along a ground surface; and lifting the aircraft structure using both the wing and the deployable wing.

15. The method of claim 14 further including the steps of:

elevating an end of the deployable wing; and extending a flexible surface of the deployable wing.

16. The method of claim 15 wherein the step of extending the flexible surface includes the steps of:

pivotally extending a pair of spars to which the flexible surface is attached; and rotating a furling rod to controllably pay out the flexible surface.

17. A method of shortening the landing of an aircraft structure having a standard wing with an area and a stall angle and comprising the steps of:

extending a deployable wing having an area substantially exceeding the area of the standard wing;

positioning the deployable wing at an angle of attack that substantially exceeds the stall angle of the standard wing;

suspending the aircraft structure using both the standard wing and the deployable wing.

18. The method of claim 17 further including the steps of:

elevating an end of the deployable wing; and extending a flexible surface of the deployable wing.

19. The method of claim 18 wherein the step of extending the flexible surface includes the steps of:

pivotally extending a pair of spars to which the flexible surface is attached; and rotating a furling rod to controllably pay out the flexible surface.

* * * * *